United States Patent [19]

Nilsen et al.

[11] Patent Number: 4,923,364

[45] Date of Patent: May 8, 1990

[54] GAS LASER APPARATUS, METHOD AND TURBINE COMPRESSOR THEREFOR

[75] Inventors: Carl J. Nilsen, Flanders, N.J.; Hardy P. Weiss, Hutten, Switzerland

[73] Assignee: PRC Corporation, Landing, N.J.

[21] Appl. No.: 287,065

[22] Filed: Dec. 21, 1988

Related U.S. Application Data

[62] Division of Ser. No. 28,203, Mar. 20, 1987, Pat. No. 4,817,111.

[51] Int. Cl.$^5$ ............................................. F04D 17/08
[52] U.S. Cl. ................................. 415/55.6; 415/179; 372/58
[58] Field of Search .............. 415/53 T, 198.2, 213 T, 415/170 R, 170 A, 177, 179, 113, 55.5, 55.6, 179

[56] References Cited

U.S. PATENT DOCUMENTS

| | | | |
|---|---|---|---|
| 2,361,726 | 10/1944 | Weimar | 415/179 X |
| 3,315,607 | 4/1967 | MacInnes | 415/198.2 |
| 3,545,890 | 12/1970 | Hubbard et al. | 415/53 TX |
| 3,634,778 | 1/1972 | Melikian | 331/94.5 |
| 3,668,549 | 6/1972 | Biancardi et al. | 331/94.5 |
| 3,720,372 | 3/1973 | Jacobs | 415/53 TX |
| 3,735,284 | 5/1973 | Hill | 331/94.5 |
| 3,876,959 | 4/1975 | Biancardi et al. | 331/94.5 G |
| 3,886,475 | 5/1975 | Pinsley | 331/94.5 P |
| 3,937,276 | 2/1976 | Ostwald | 415/179 X |
| 4,141,674 | 2/1979 | Schonwald | 416/223 A |
| 4,206,429 | 6/1980 | Pinsley | 331/94.5 P |
| 4,280,105 | 7/1981 | Marcy | 331/94.5 P |
| 4,319,201 | 3/1982 | Bush et al. | 372/58 |
| 4,321,558 | 3/1982 | Zappa | 372/58 |
| 4,504,954 | 3/1985 | Guers et al. | 372/61 |

FOREIGN PATENT DOCUMENTS

| | | | |
|---|---|---|---|
| 686705 | 2/1960 | Canada | 415/53 T |
| 731085 | 12/1942 | Fed. Rep. of Germany | 415/179 |

OTHER PUBLICATIONS

Turbo-Machines A Guide to Design, Selection and Theory-O. E. Balje pp. 456 and 457.
An ASME Publication-Paper No. 78-WA/PID-2; An Investigation of Regenerative Blowers and Pumps by U. W. Hollenberg and J. H. Potter pp. 1–6.
Turbovac-Turbomolecular Pumps and Accessories, pp. 7.2 to 7.33.
Roots Vacuum Pumps and Pumping Stations-PP 800 022 PE (8205), pp. C1-C33.
Ruvac-Roots Pumps And Accessories-Leybold-Heraeus Vacuum Products Inc., pp. 6.2-6.28.

*Primary Examiner*—Everette A. Powell, Jr.
*Attorney, Agent, or Firm*—Antonelli, Terry & Wands

[57] ABSTRACT

A fast axial flow gas laser apparatus comprising an at least essentially closed loop defining a flow path for a laser gas, an arrangement for exciting gas flowing in the loop of the apparatus to cause the gas to lase, and a regenerative compressor for flowing gas through the closed loop along the flow path. The compressor is capable of operating with a pressure ratio sufficient to flow the gas along at least a portion of the loop at a speed at least half the speed of sound in the gas with inlet pressures of only a small fraction of an atmosphere. The uniform discharge pressure of the compressor results in a uniform laser discharge or output. A positive pressure fluid pressure seal prevents lubricant at a bearing support for the impeller shaft of the compressor from moving to the impeller and possibly contaminating the laser gas being compressed thereby and also prevents surrounding air from contaminating the laser gas. The pressurized fluid of the seal is permitted to migrate into the laser gas as make-up gas. The compressor is capable of moving gas through the laser at speeds approaching the speed of sound for high power output from the laser without power fluctuations and with minimal service requirements and long life while occupying only a small area within an existing laser cabinet.

16 Claims, 13 Drawing Sheets

FIG. 16
FIG. 17
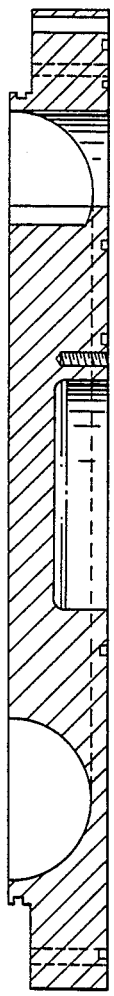
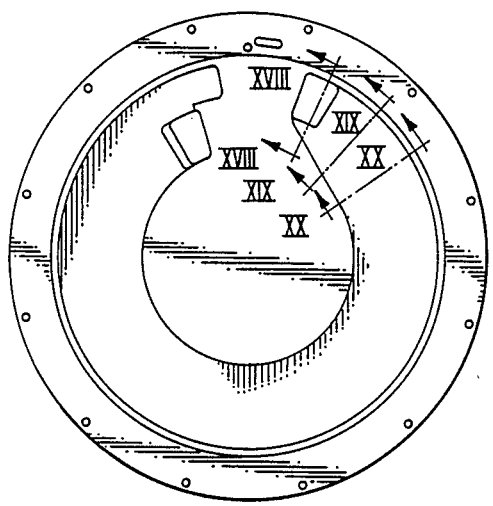
FIG. 18
FIG. 19
FIG. 20

GAS LASER APPARATUS, METHOD AND TURBINE COMPRESSOR THEREFOR

BACKGROUND AND SUMMARY OF THE INVENTION

The present invention is directed to an improved gas laser apparatus, method of lasing gas and a turbine type compressor therefor. More particularly, the invention relates to an improved fast axial flow gas laser apparatus wherein gases are circulated in a closed loop through the laser tube at speeds approaching the speed of sound in the laser gas.

In known fast axial flow gas lasers the gas is generally moved through the laser by use of a Roots blower. A Roots blower is characterized by the use of two rotors which are moved in synchronism in relation to one another by means of gears and a driving motor. Typically, the rotors rotate at a speed of 3,600 rpm. A gas laser with a single stage Roots blower or pump operating at this speed is disadvantageous for certain laser applications because the output of the blower has a 240 Hertz fluctuation in its discharge pressure. This pulsing or reverberation in the pressure output of the blower results in a corresponding fluctuation or instability in the laser discharge which, in turn, causes instability in the power output of the laser. Such fluctuations in the power output of the laser are unacceptable in many applications, e.g., fine engraving, cutting, welding, etc. If the discharge flow of the Roots blower is dampened to avoid these pressure fluctuations, there is a reduction in the useful output power or efficiency of the blower and the associated gas laser. The vibration also associated with the Roots blower can be disadvantageously transmitted to the laser itself to actually vibrate the output laser beam.

The gears and bearings normally employed in the typical Roots blower require lubrication. The grease or oil used for this purpose poses a serious problem for the operation of both the blower and the associated laser. That is, if this oil leaks into the pumping chamber of the Roots blower, it can break down and be deposited on the lobes of the blower impellers, closing the small gaps between the lobes and adjacent pump housing and causing the lobes to seize in the pump housing. Oil leaked into the laser gas will be vaporized in the laser tube thereby effecting discharge stability. Oil vapor deposited on the optical elements of the laser results in deterioration of the laser performance and reduces the life of the optics. To prevent these occurrences, vacuum chambers are provided in Roots blowers adjacent the pumping chamber. A higher vacuum is maintained in the vacuum chambers than in the pumping chamber, so that any oil leaking from the gears and bearings will be drawn into these higher vacuum chambers and not the pumping chamber to thereby maintain the integrity of the blower and laser. The provision of such protective, higher vacuum chambers adds to the cost of the blower and contamination can still occur in the event of failure of the higher vacuum chamber.

The Roots blower is also disadvantageous because of its considerable size and weight. Further, it requires frequent servicing of lip seals provided therein about the rotary shaft of the blower. Every 800 to 1,000 hours of operation a trained technician must shut down the operation of the blower to service the lip seals. The down time associated with this type of service as well as the labor costs of the trained technician increase the cost of the related manufacturing operation.

An object of the present invention is to provide an improved gas laser apparatus, method of lasing gas and a turbine type compressor therefor which avoid the aforementioned disadvantages of known gas laser apparatus and methods employing the conventional Roots blower. More particularly, an object of the present invention is to provide a gas laser apparatus which has a continuous, stable discharge and power output, so that fine engraving, cutting, welding, etc., can be performed.

A further object of the invention is to provide an improved gas laser apparatus, method of lasing gas and a turbine type compressor therefor wherein the problems of lubricant contamination of the laser gas in the compressor are eliminated without the provision of special higher vacuum chambers adjacent the compressor.

An additional object of the invention is to provide an improved gas laser apparatus, method of lasing gas and a turbine type compressor therefor, wherein the size and weight of the compressor are reduced as compared with the conventional Roots blower and wherein the compressor has a long life and does not require the frequent servicing of lip seals required by a Roots blower.

These and other objects of the invention are attained by the gas laser apparatus of the invention which comprises means defining a flow path for a laser gas, means for exciting gas flowing in the apparatus to cause the gas to lase, and a turbine type compressor for flowing gas along the flow path, wherein the compressor has a head coefficient of at least 0.8 and is capable of operating with a pressure ratio sufficient to flow the gas along at least a portion of the flow path at a speed of at least half the speed of sound in the laser gas with an inlet pressure to the compressor of less than one-third atmospheric pressure. The means defining the flow path forms an at least essentially closed loop for recirculating gas through the laser apparatus. The closed loop includes the compressor.

The specific pressure ratio pr of the compressor depends on the gas or mixture of gases used with the laser apparatus and the mixing ratio of the components of the gas mixture. With a gas mixture of helium, nitrogen and carbon dioxide according to a disclosed embodiment, the compressor is capable of operating with a pressure ratio of at least 1.5:1 with an inlet pressure of between 50 and 100 torr, for example, and a mass flow through the compressor on the order of several hundred cubic feet per minute or more.

In the disclosed, preferred embodiment of the invention, the turbine type compressor for flowing gas through the laser tube is a regenerative compressor which comprises an impeller rotatable about an axis and having generally radial blades extending from at or near the tip of the impeller inward a distance of no more than about 50% of the radius of the impeller. Axially opposite the blades of the impeller is a means defining a stationary annular passage with an inlet and an outlet being provided for communicating the gas to and from the passage for peripheral flow in the passage in the direction of rotation of the impeller. A dam is provided blocking the annular passage between the inlet and outlet. The dam has close clearance over the impeller. In the disclosed embodiment, the regenerative compressor is a two stage compressor with the respective stages being located on opposite sides of a single impeller. An intercooler is provided between the first and second stages of the compressor for cooling gas compressed in the first stage before it enters the second stage for further compression. The intercooler includes a heat exchanger formed with a plurality of concentric tubes where the passages between adjacent tubes respectively convey the gas and a coolant fluid for heat exchange to cool the gas as it passes through the heat exchanger. Both sides of the compressor housing and also the radially outer or circumferential surface thereof are also cooled by circulating coolant through passages provided therein so that the gas is cooled as it is being compressed. This is particularly important for effective cooling and efficient compressor operation especially with the very low pressures at which the compressor operates. Approximately 50% of the required gas cooling to remove the heat of compression is taken out by the cooling incorporated in the compressor housing. This gives the effect of interstage cooling which results in increased compression efficiency.

The impeller of the regenerative compressor is rotatably supported on a drive shaft of the compressor at a first location along the shaft. The impeller is rotated about the longitudinal axis of the drive shaft at a high speed such that the circumferential speed of the impeller is a substantial fraction of or near the sonic speed for the laser gas. In this way the acceleration of the gas in the compressor approaches the speed of sound in the gas in the compressor at the tip of the impeller blades thereby minimizing friction losses. In the disclosed embodiment, the speed of rotation is about 10,000 rpm.

Lubricated bearing means rotatably support the drive shaft at at least a second location along the shaft spaced from the first location. A positive pressure fluid seal means is provided for preventing lubricant from the bearing means from moving along the drive shaft to the impeller and contaminating the laser gas. The fluid seal means includes a mating ring sealingly attached to the drive shaft between the first and second locations for rotation with the shaft, a pair of annular, spaced stationary members located about the shaft and presenting respective sliding faces for contacting respective opposite sides of the mating ring, and means for directing a fluid or buffer gas under a pressure slightly above the pressure of the gas in the compressor, between the sliding faces and the mating ring and along the drive shaft during operation of the compressor to prevent lubricant from the bearing means from moving along the drive shaft to the impeller. In the preferred embodiment of the invention, the buffer gas, which is non-contaminating with respect to the laser gas, is permitted to migrate into the laser gas to prevent leakage of atmospheric gas into the laser gas and to serve as a make-up gas for losses of the laser gas. Preferably, the buffer gas is the same kind of gas used in the laser.

The drive shaft and the impeller in the disclosed embodiment of the compressor are rotated at a speed of about 10,000 rpm and because in each stage of the compressor the impeller carries characteristically 30 blades thereon, the pressure of the compressor discharge is continuous and stable. Therefore, a more continuous, stable laser discharge and laser power output can be produced. The size and weight of the regenerative compressor of the invention are also less than those of the typical Roots blower which permit a reduction in the size and weight of the gas laser apparatus. The regenerative compressor also has a relatively long life and needs only infrequent servicing. Gas, magnetic, ball or roller bearings can be used in the compressor without fear of contamination of the laser because of the special sealing arrangement of the invention. Further, the requirements for two rotors and gears as in Roots blowers are avoided with the regenerative compressor of the invention.

The method of lasing gas in a fast axial flow gas laser according to the invention comprises the steps of compressing a gas in a turbine type compressor operating with a head coefficient of at least 0.8 and with a pressure ratio sufficient to flow the gas along at least a portion of a flow path for the gas in the laser at a speed of at least half the speed of sound in the gas, conveying gas compressed by the compressor along the flow path for said gas in the laser and exciting said gas to cause it to lase. The gas is recirculated through the laser in a closed loop. The compressor forms part of the closed loop flow path for the gas. Preferably the gas is moved at speeds which approach or even exceed the speed of sound along at least a portion of the flow path in the laser. The method further includes the steps of cooling the gas both before, during and after compression in the regenerative compressor as it moves through the closed loop of the apparatus, and positively sealing the lubricant in the compressor against movement into the laser gas by means of a pressurized fluid seal. The pressurized fluid of the seal is permitted to move into the gas being compressed to make-up for lost laser gas.

These and other objects, features and advantages of the invention will become more apparent from the following description when taken in connection with the accompanying drawings which show, for purposes of illustration only, several embodiments according to the invention.

BRIEF DESCRIPTION OF THE DRAWINGS

FIG. 16 is a cross-sectional view of the first stage of FIG. 13 taken along the line XVI—XVI;

FIG. 17 is an side view of the inner side of the first stage volute;

FIG. 18 is a cross-sectional view of a portion of the flow passage in the first stage volute taken along the line XVIII—XVIII in FIG. 17;

FIG. 19 is a cross-sectional view taken along the line XIX—XIX in FIG. 17;

FIG. 20 is a cross-sectional view of the flow passage taken along the line XX—XX in FIG. 17;

DETAILED DESCRIPTION OF THE PREFERRED EMBODIMENTS

Figure 1:
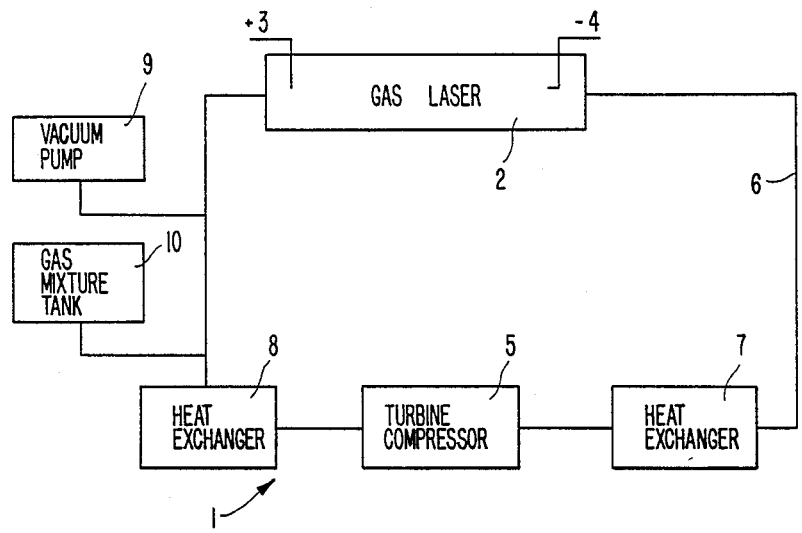
FIG. 1 is a schematic illustration of a gas laser apparatus according to the invention.

Referring now to the drawings, a gas laser apparatus 1 according to the invention is schematically illustrated in FIG. 1. The apparatus comprises a laser tube or other structure 2 defining a flow path for the fast axial flow of a laser gas, at least two electrodes 3 and 4 arranged for electrically exciting gas flowing in the apparatus to cause the gas to lase in the laser tube, and a turbine type compressor 5 for flowing gas through the laser tube. The compressor has a pressure or head coefficient of at least 0.8 and is capable of operating with a pressure ratio sufficient to flow the gas along at least a portion of the flow path in the laser at a speed of at least half the speed of sound in the laser gas. The laser gas can be a gas mixture of approximately 80% helium and approximately 20% nitrogen (small amounts of carbon dioxide gas included). The laser tube 2 and compressor 5 form part of an essentially closed loop 6 for recirculating gas through the gas laser and the compressor. Heat exchangers 7 and 8 are also provided in the essentially closed loop 6 on respective sides of the turbine compressor for cooling the circulating gas flowing to and from the turbine compressor 5. A vacuum pump 9 is placed in fluid communication with the closed loop 6 for maintaining the necessary low pressure, for example a pressure within the range of 50 to 200 torr, required for the operation of the gas laser. A gas mixture tank 10 is also provided in selective communication with the closed loop 6 for supplying and replacing the gas in the loop to be lased. The replacing of laser gas in the loop is also achieved by the positive fluid pressure seal in the compressor during operation of the compressor as discussed below.

The pressure or head coefficient $\psi$ of the compressor is at least 0.8 per stage and is defined by the expression:

$$\psi = \frac{g \times \text{head}}{U^2}$$

where $g = 32.2$ (ft. per sec.$^2$)

$U =$ Impeller Tip Speed of the Compressor (Ft. Per Sec.)

$$\text{Head} = \frac{\tau}{\tau - 1} RT_1 \left[ \frac{P_2^{\frac{\tau-1}{\tau}}}{P_1} - 1 \right] \text{Feet}$$

$\tau =$ Ratio Spec. Heats
$R =$ Gas constant (Ft/°F.)
$T_1 =$ Inlet Temp. (°R)
$P_1 =$ Inlet Press. (psia)
$P_2 =$ Outlet Press. (psia)

With the compressor of the invention the pressure of the gas can be built up higher while operating the compressor at a lower speed as compared with a single stage centrifugal compressor, for example, where the head coefficients are only about 0.5–0.7. With lower operating speeds of the compressor of the invention, the centrifugal forces and therefore the stresses are much less than at higher speeds, which leads to longer life and less maintenance as compared with a single stage centrifugal compressor. According to the preferred embodiment of the invention, the compressor is a two stage regenerative compressor where each stage has a head coefficient of about 3.0.

As noted above, the gas laser apparatus 1 is a fast axial flow laser wherein the gas is moved through the laser tube 2 or at least through a portion thereof at speeds at least one half the speed of sound in the laser gas and preferably at speeds approaching the speed of sound. The velocity of sound vs for a gas is $vs = nRT$ where n is the isentropic exponent of the gas mixture, R is the individual gas constant and T is the absolute temperature. For the above mixture of helium, nitrogen and carbon dioxide vs equals about 560 meters per second, and for pure helium vs is 1200 meters per second. The high speeds of the gas in the laser tube 2 can be achieved by passing the gas from the compressor 5 through a nozzle immediately upstream of the laser tube 2 which serves to accelerate the gas. As an example, a laser tube having a diameter of 18 mm can be supplied with gas from the turbine compressor through a conduit having a diameter of 19 mm with a nozzle having a 9 mm diameter opening therein placed in the flow path immediately upstream of the laser tube 2 to substantially increase the speed of the gas flow to at least one half of the sonic speed and preferably to a speed approaching or even exceeding the sonic speed for the gas. The nozzle increases the pressure drop of the moving gas in the closed loop 6 beyond that caused by the laser tube, so that the pressure ratio of the outlet pressure of the compressor to the inlet pressure of the compressor is, for example, 1.7:1 with an inlet pressure of 90 torr to the compressor and a mass flow through the compressor of about 300 cu. ft. per minute using a gas mixture of approximately 80% helium and approximately 20% nitrogen with a small amount of carbon dioxide. More generally, the pressure ratio pr of the compressor depends on the mixture of gases used with the laser and the mixing ratio of the components of the gas mixture. The pressure ratio pr is expressed by $pr = (2/n + 1))\exp(n/n - 1)$ where n is the isentropic exponent of the gas mixture. The pressure ratio influences the mass flow density (kg per s and per m$^2$) which is the limiting factor. Flow rates of 300 cfm or more are achieved in the turbine compressor of the invention while the size of the compressor is small to fit within the cabinet of a commercial gas laser.

The expression "laser tube" used herein is not intended to be limited to a straight tube as shown herein but encompasses other geometries as well such as a tapered tube, for example. The type of excitation of the laser gas can also vary. For example, direct current electrical excitation, radio frequency excitation, and/or other forms of pumping such as chemical and thermal pumping could be used.

Figure 2:
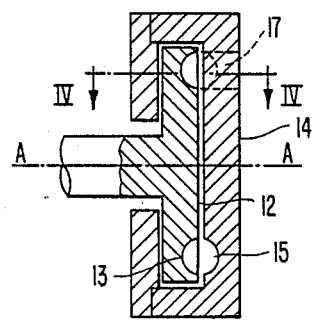
FIG. 2 is a schematic, cross-sectional view taken along the line II—II of a single sided regenerative compressor with circular flow channel as shown in FIG. 3.
Figure 3:
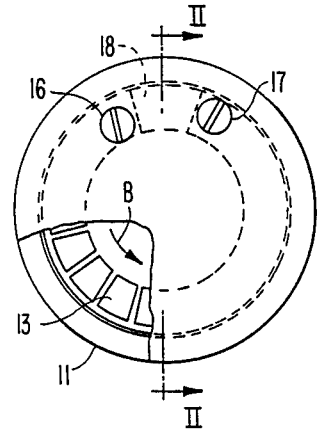
FIG. 3 is a side elevational view, partially in cross-section, of the right side of the compressor of FIG. 2.
Figure 5:
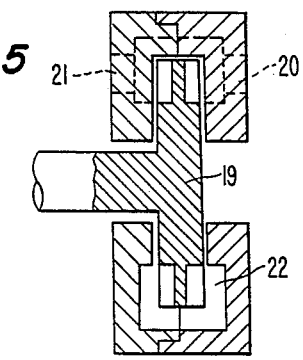
FIG. 5 is a schematic view, partially in cross-section, of a double-sided regenerative compressor with rectangular flow channel.
Figure 4:
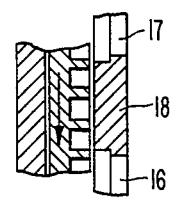
FIG. 4 is a cross-sectional view of a portion of the regenerative compressor of FIGS. 2 and 3 taken along the line IV—IV and FIG. 2.

The turbine type compressor 5 according to a preferred embodiment of the invention which has the aforementioned operating characteristics of head coefficient, pressure ratio, inlet pressure and mass flow is preferably a regenerative compressor as noted above. It has been found that the use of a regenerative compressor in the gas laser apparatus enables the compressor to have fewer stages of compression and to be operated at lower speeds to achieve the desired pressure ratio, as compared with a centrifugal compressor, for example, and therefore, provides a less complex machine having higher reliability, lower initial cost and a longer operating life. The compressor can also be relatively compact for use in commercial lasers as noted above. As shown in FIGS. 2-4, the regenerative compressor 11 comprises an impeller 12 rotatable about an axis A—A and having generally radial blades 13 extending from at or near the tip of the impeller inward a maximum distance of about 50% of the radius of the impeller Axially opposite the blades 13 of the impeller is a volute 14 of the impeller housing which defines a stationary annular passage 15 with an inlet 16 and an outlet 17 being provided for communicating the gas to be compressed to the passage 15 and the gas compressed therein from the passage. A peripheral flow of the gas occurs in the passage in a direction of rotation of the impeller, arrow B in FIG. 3. A dam or stripper 18 is provided to block the annular passage 15 between the inlet and outlet. The dam has a close clearance over the impeller 12. The regenerative compressor illustrated in FIGS. 2-4 is a single-sided compressor with circular flow channel. A two stage regenerative compressor is illustrated in FIG. 5 wherein it is seen that the first and second stages of the compressor are located on respective sides of the single impeller 19. Gas enters the annular passage through the inlet 20 for compression by the blades on one side of the impeller 19 and then passes through a rectangular flow channel 22 to the second stage where it is compressed by the blades on the second side of the impeller 19 after which it is moved through the outlet 21.

Figure 31:
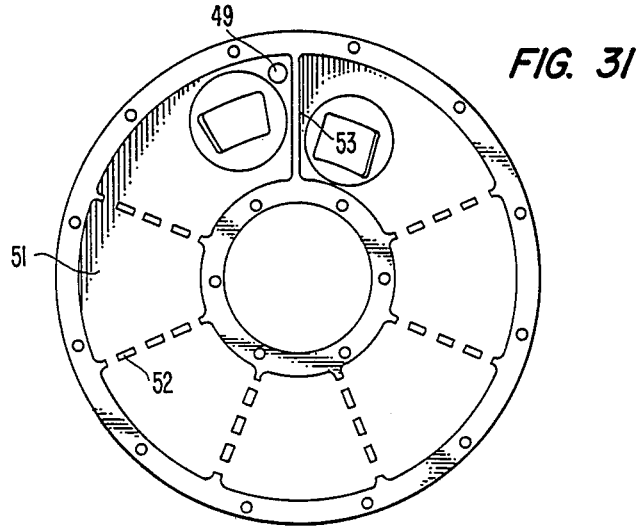
FIG. 31 is a side view of the inner side of the water manifold of FIG. 29 and illustrating the water passage relief therein.
Figure 21:
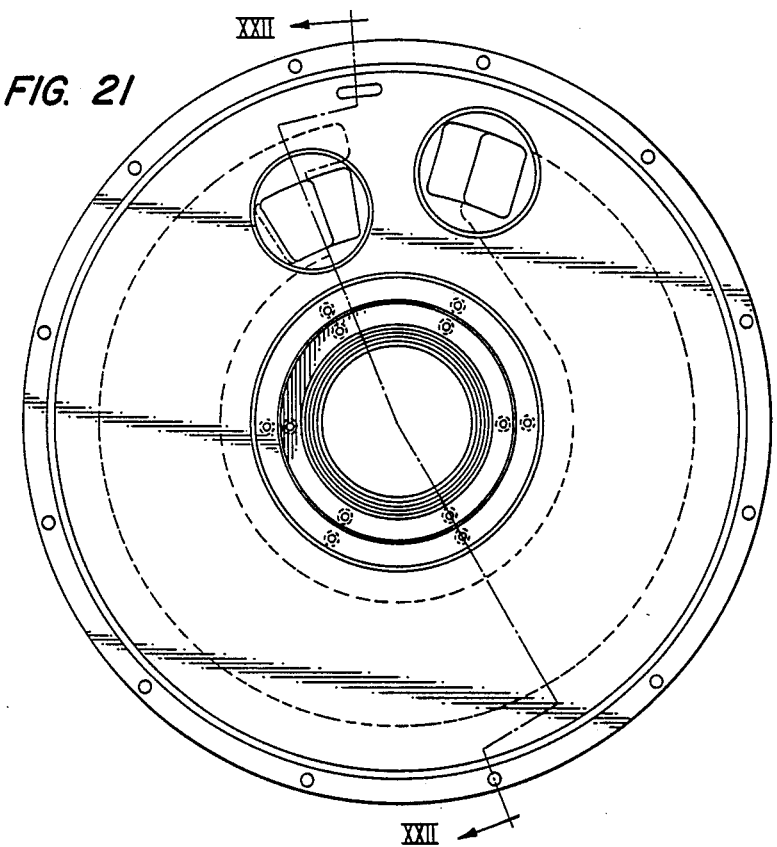
FIG. 21 is a side view of the outer side of the second stage volute of the compressor of FIG. 6.
Figure 28:
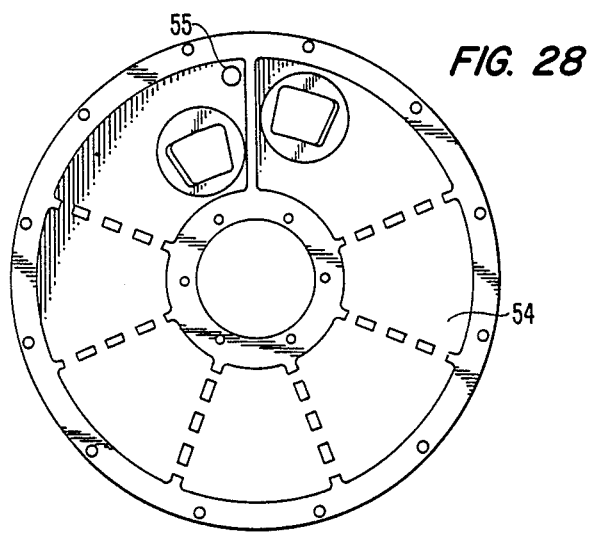
FIG. 28 is an inner side view of the water manifold first stage of FIG. 23 and illustrating the water passage relief therein.
Figure 29:
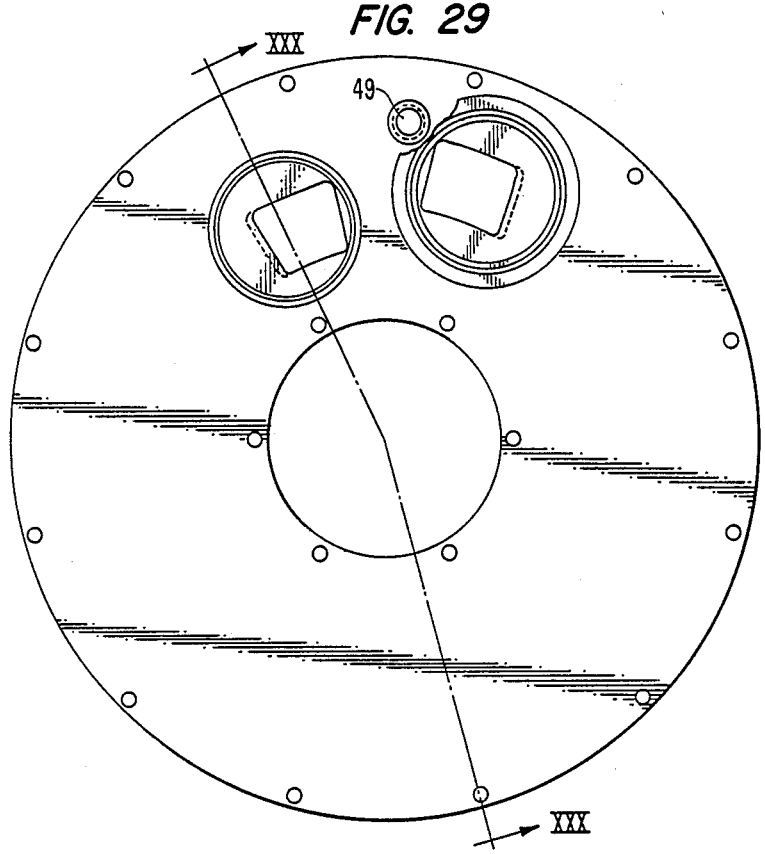
FIG. 29 is a side view of the outer side of the second stage water manifold.
Figure 32:
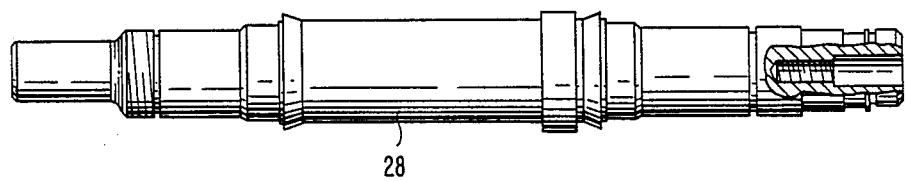
FIG. 32 is a side view, partially in cross-section of the shaft of the compressor of FIG. 6.
Figure 33:
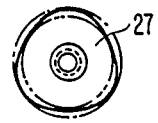
FIG. 33 is a right end view of the shaft of FIG. 32 showing the polygonal configuration thereof.
Figure 40:
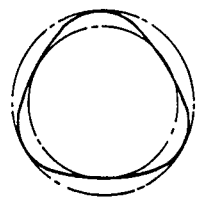
FIG. 40 is a view of the configuration of the shaft receiving opening of the impeller shown in FIG. 39 taken in the direction of arrow A.
Figure 39:
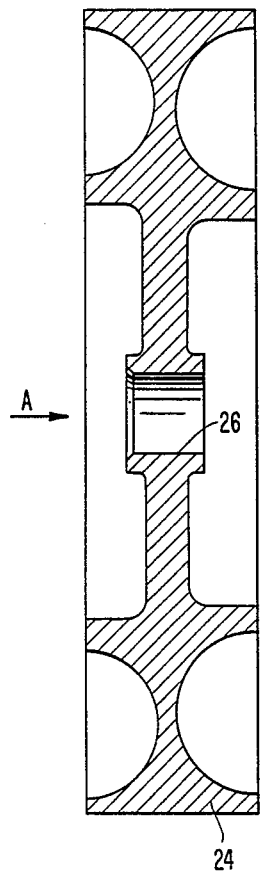
FIG. 39 is a cross-sectional view of the impeller of FIG. 37 taken along the line XXXIX—XXXIX.
Figure 41:
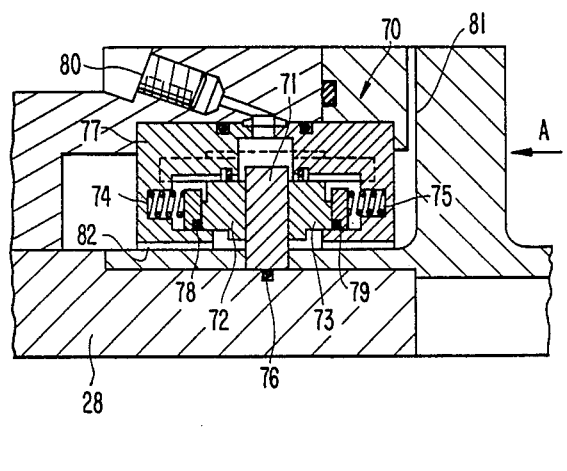
FIG. 41 is a side view, partially in cross section, of a portion of the pressure fluid seal in the compressor of FIG. 6.

According to the preferred form of the invention, the turbine type compressor is a two stage, double-sided regenerative compressor as shown in detail in FIGS. 6-41. The compressor 23 has an impeller 24 with basically radial blades 25 extending from at or near the tip of the impeller inwardly a distance of no more than about 50% of the radius of the impeller, see particularly FIGS. 37-40. More specifically, each side of the impeller is provided with characteristically 30 blades which are spaced and located mid-way between blades on the opposite side. The blades are inclined forwardly at 40°±5° for necessary compression of the low density laser gas. The desired degree of inclination of the blades depends on the gas mixture and the sonic velocity thereof and, therefore, it could vary. The impeller is formed of cast aluminum alloy A356.0 temper T6 or other suitable material. A central bore 26 therein is machined to have an opening in the form of a polygon as shown in FIG. 40. The impeller is mounted for rotation upon a correspondingly shaped end 27 of a drive shaft 28 as shown in FIGS. 32 and 33. The impeller is retained on the end 27 of the drive shaft 28 by a ring 29 and fastener 30 depicted in FIG. 6. The rounded lobes of the polygon shaped end 27 of the drive shaft 28 and the complimentarily shaped bore in the impeller 24 distribute the load or stresses around the shaft and eliminate the need for a key or spline.

Figure 34:
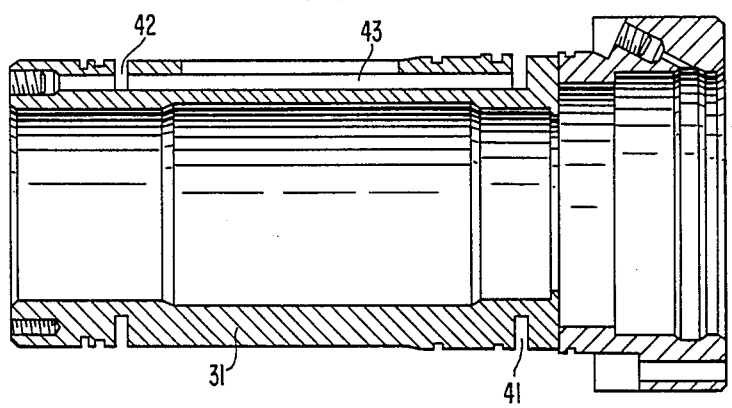
FIG. 34 is a cross-sectional view along the longitudinal axis of the bearing housing of the compressor of FIG. 6.
Figure 35:
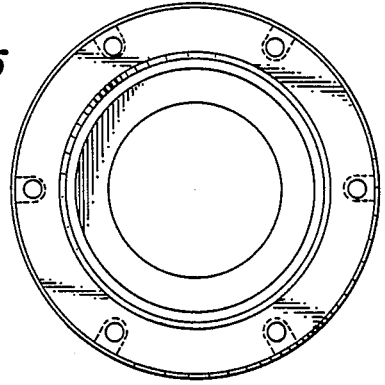
FIG. 35 is a right end view of the bearing housing of FIG. 34.
Figure 36:
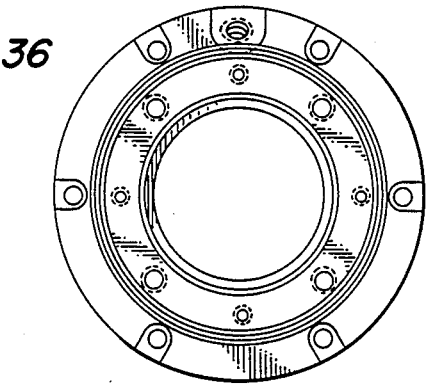
FIG. 36 is a left end view of the bearing housing of FIG. 34.
Figure 37:
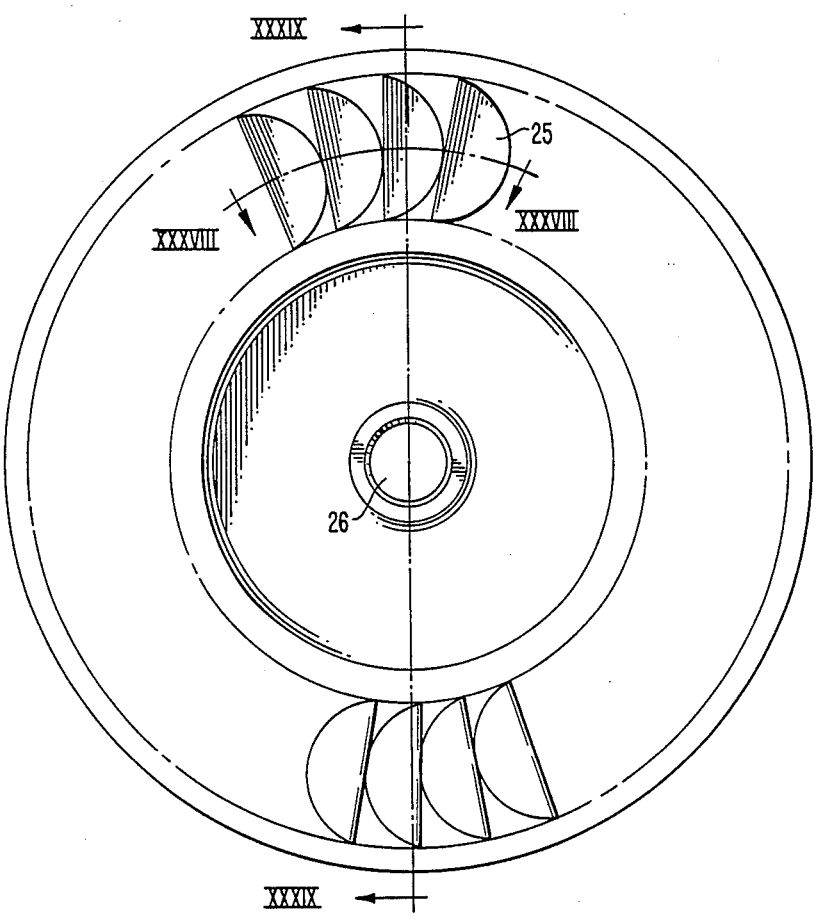
FIG. 37 is a side view of the impeller of the compressor of FIG. 6.
Figure 38:
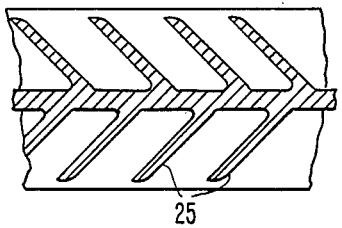
FIG. 38 is a cross-sectional view through a portion of the impeller of FIG. 37 taken along the line 38-38.

The drive shaft 28 is rotatably supported within a bearing housing 31, see FIGS. 34-36, by means of high speed bearings 32 and 33. The drive shaft 28 is rotated at high speed, about 10,000 rpm, specifically 9,908 rpm., by a motor 34 through a driving connection comprising toothed pulleys 35 and 36 on the output shaft of the motor and free end of the drive shaft 28, respectively, and a high torque drive belt 37 extending about the pulleys. Direct drive could also be used. The desired rotational speed can be calculated for a given impeller diameter and sonic speed for the laser gas knowing that the circumferential speed of the impeller should be a substantial fraction of or near the sonic speed to avoid friction losses. The diameter of the impeller is approximately 13 inches in the disclosed embodiment. A nut 38 is provided on the drive shaft 28 to preload the shaft with bearings and balance the system, so that its critical speed is higher than the operating speed by a factor of 1.4 or more. Grease fittings 39 and 40 are formed in the bearing housing 31 for greasing the bearings 31 and 32, respectively. Alternatively, instead of lubricated bearings, it is possible to use other types of bearings such as gas bearings. A water inlet 41, water outlet 42 and interconnecting water passages 43 are provided in the bearing housing for cooling the housing, bearings and shaft.

Figure 6:
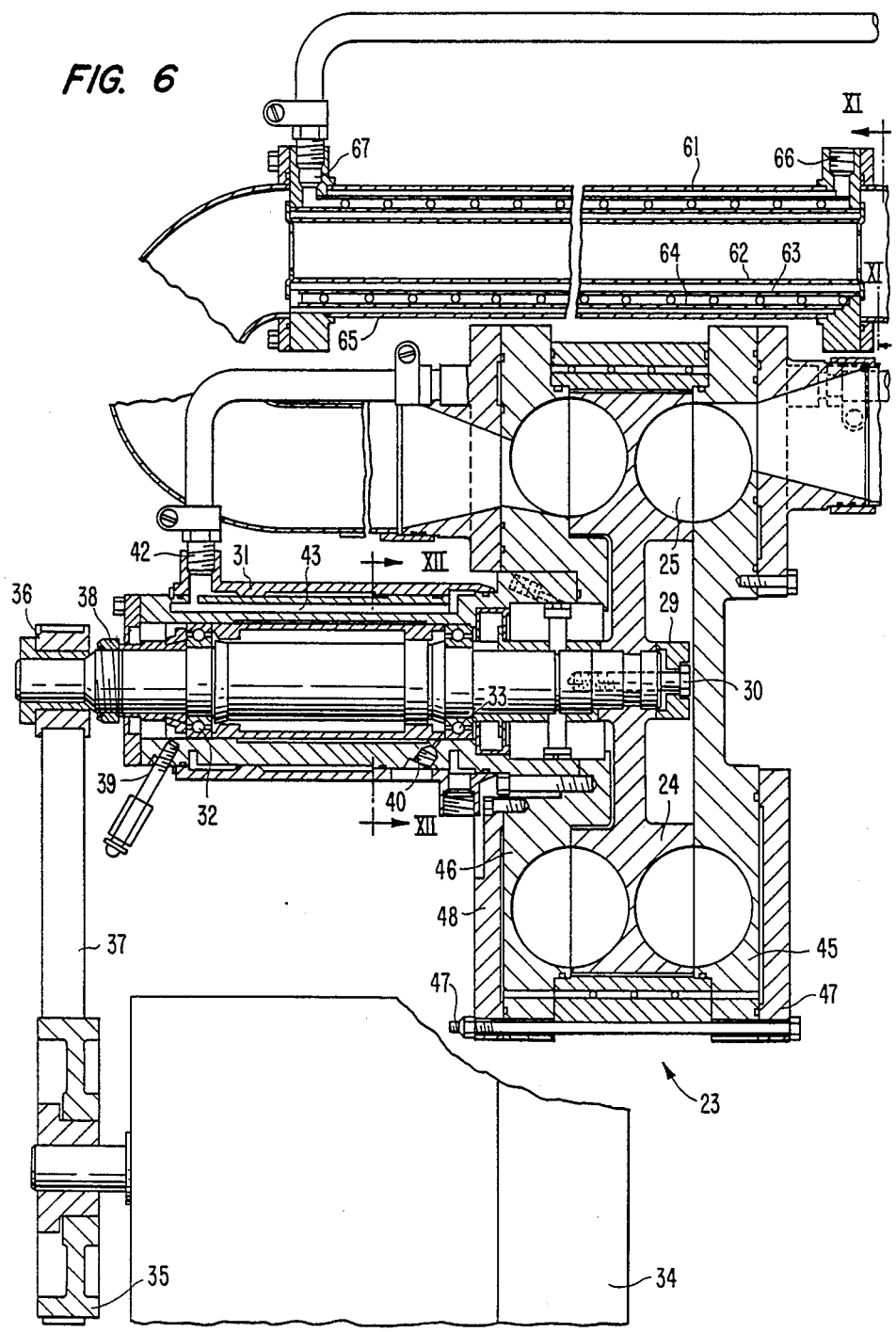
FIG. 6 is a, partially in cross-section, side view of a two stage, double sided regenerative compressor according to a preferred embodiment of the invention.
Figure 7:
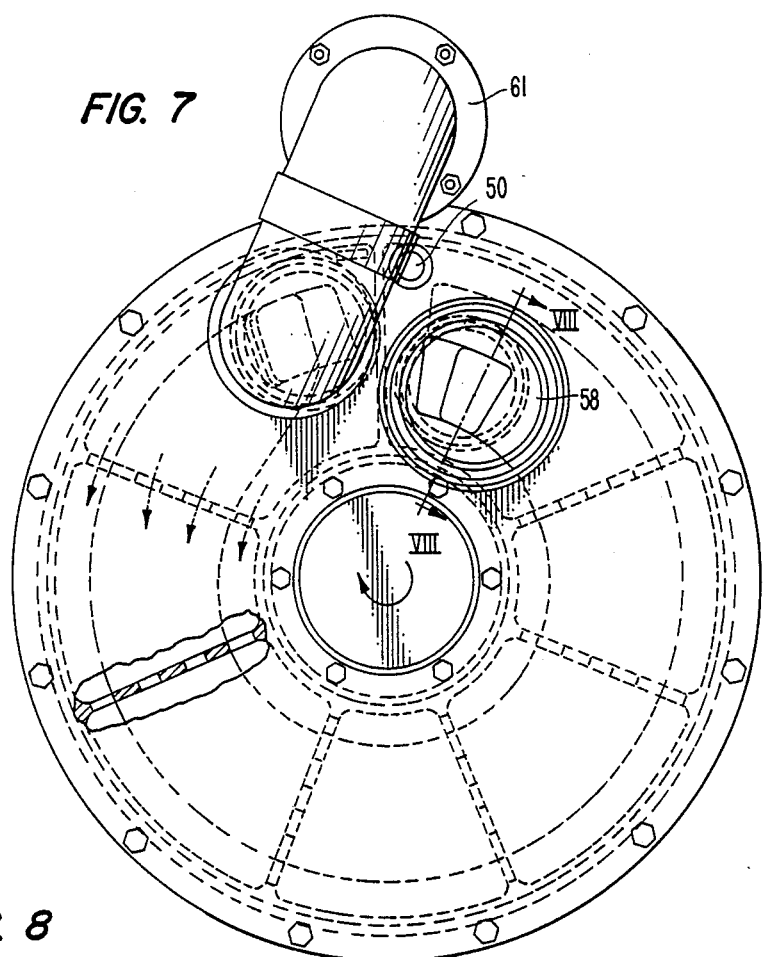
FIG. 7 is an end view of the compressor of FIG. 6 taken from the right side of FIG. 6.
Figure 8:
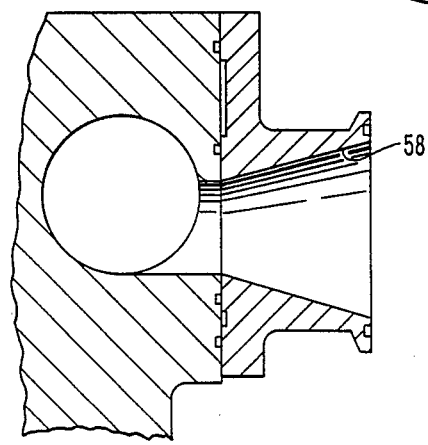
FIG. 8 is a cross-sectional view of the first stage inlet of the compressor taken along the line VIII—VIII in FIG. 7.
Figure 10:
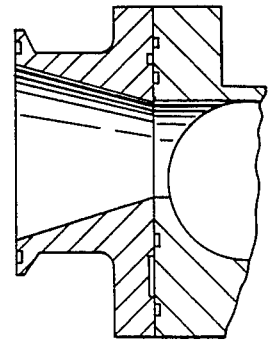
FIG. 10 is a cross-sectional view of the second stage inlet taken along the line X—X in FIG. 9.
Figure 9:
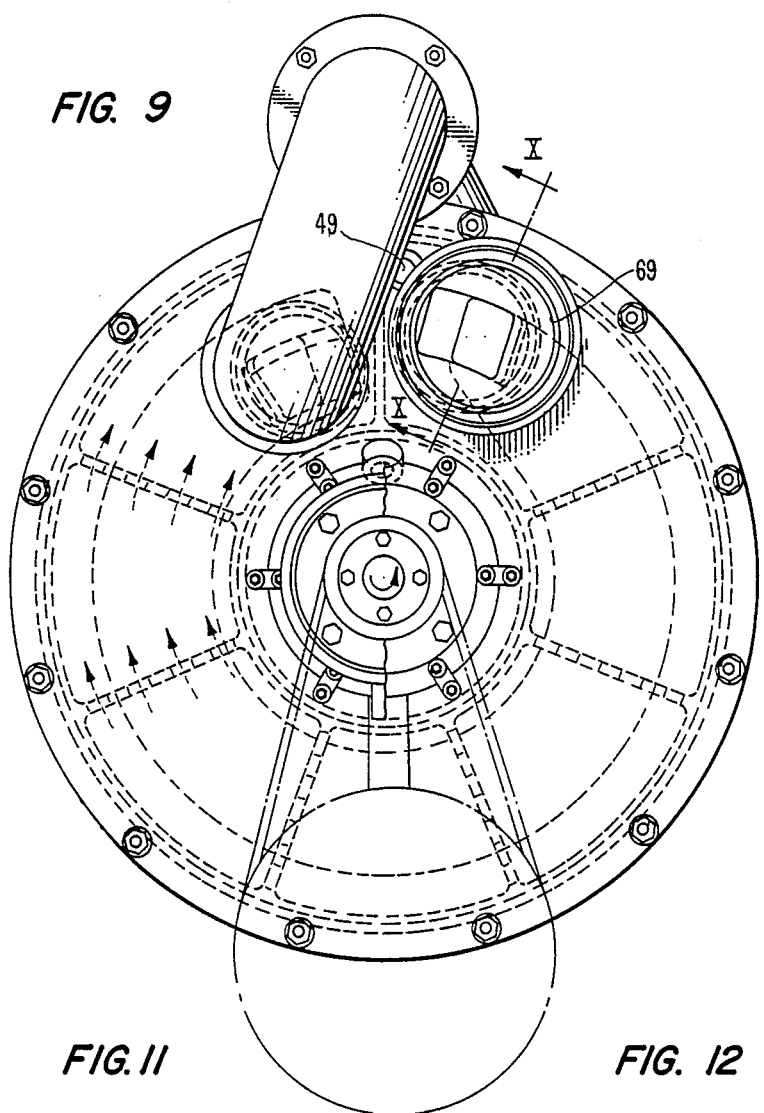
FIG. 9 is an end view of the compressor taken from the left side of the compressor shown in FIG. 6.
Figure 30:
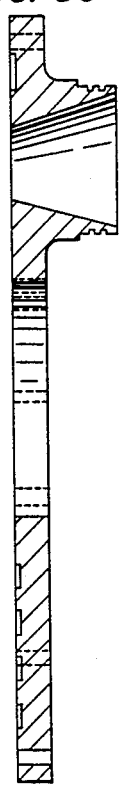
FIG. 30 is a cross-sectional view of the water manifold of FIG. 29 taken along the line XXX—XXX.

The impeller 24 is rotated at high speed within a stationary, water cooled impeller housing 44. Stationary first and second stage volutes 45 and 46 are sealingly connected to the impeller housing 44 by means of fasteners 47 as shown in FIG. 6. Water manifolds 47 and 48 are provided on the outer end surfaces of the first and second stage volutes, respectively for cooling the compressor. Cooling water is circulated from an inlet 49 in the second stage water manifold 48, see FIG. 9, through an annular channel 51 in the surface of the manifold 48 adjacent the second stage volute 46. A plurality of webs 52 spaced radially about the manifold 48 in the passage 51 as shown in FIGS. 30 and 31 permit the water to pass therethrough while maintaining relative spacing between the manifold and the adjacent volute. A continuous web 53 to one side of the water inlet 49 forces the cooling water to pass completely around the annular passage 51 to an outlet or passage for conveying the water through the adjacent volute, impeller housing 44, and first stage volute 45 to the annular cooling passage 54 in the first stage water manifold 47. The incoming cooling water is similarly circulated preferably through the annular passage 54 adjacent the first stage volute for cooling the same and then exits through an outlet 55. The compressor operates at very low pressures at discussed above. This makes it more difficult to cool the compressor because of the low density of gas passing through the compressor. By cooling essentially the entire surface of both sides of the compressor and also the radially outer or circumferential surface thereof in the manner described, satisfactory cooling is obtained. Approximately 50% of the required gas cooling to remove the heat of compression is taken out by the cooling incorporated in the compressor housings. This gives the effect of interstage cooling which results in increased compression efficiency. Additional interstage cooling is accomplished in an intercooler 61 as discussed below.

Each of the first and second stage volutes 45 and 46 is formed with an annular passage, identified as 56 and 57, respectively, see FIGS. 13-22. The passage 56 of the first stage volute 45 has an inlet 58 for the laser gas to be compressed. A dam 59 blocks the annular passage between the inlet and outlet 60 from the passage 56. The dam has a close clearance over the impeller so as to require the gases from the inlet to flow through the full length of the passage 56 to the outlet. The gas passing through the annular passage 56 from the inlet to the outlet is subjected to compression during its interaction with the blades of the adjacent, rotating impeller. The compressor can be considered, in effect, a multi-stage centrifugal because the flow in the channel enters the blading passages of the impeller at the inner diameter thereof and due to centrifugal action, flows out at the tip at a higher tangential velocity. It then imparts momentum to the remaining gas in the stationary channel which is traveling at an average velocity of less than that of the impeller. The gas then flows radially inward and re-enters the impeller at the inner diameter. The pressure build-up around the periphery between the inlet and the outlet is sustained by the momentum exchange.

Figure 11:
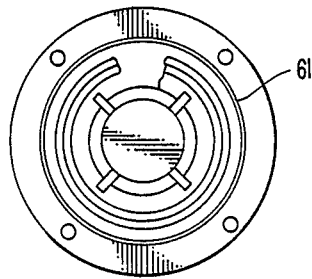
FIG. 11 is a cross-sectional view taken along line XI—XI in FIG. 6 and showing an end view of the heat exchanger or intercooler thereof.
Figure 12:
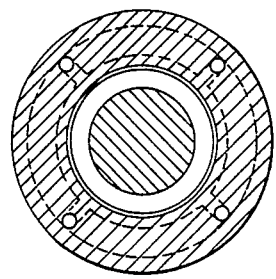
FIG. 12 is a cross-sectional view taken along line XII—XII in FIG. 6 and showing the bearing housing with coolant water distribution holes therein.
Figure 13:
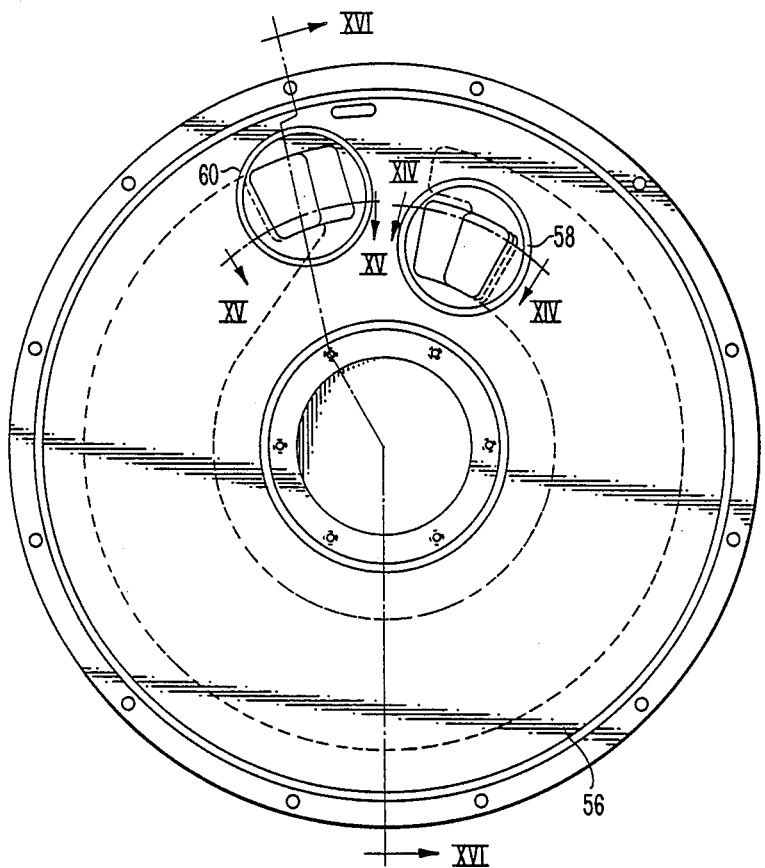
FIG. 13 is an side view of the outer side of the first stage volute of the compressor of FIG. 6.
Figure 14:
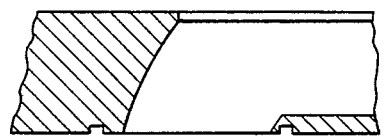
FIG. 14 is a cross-sectional view of the gas inlet taken along the line XIV—XIV in FIG. 13.
Figure 15:
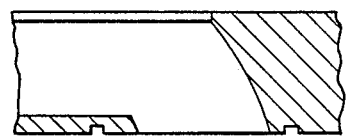
FIG. 15 is a cross-sectional view taken along the line XV—XV in FIG. 13 in showing the gas outlet.
Figure 22:
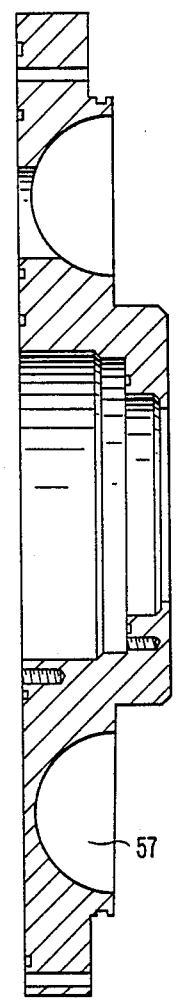
FIG. 22 is a cross-sectional view of the second stage volute in FIG. 21 taken along the line XXII—XXII.
Figure 25:
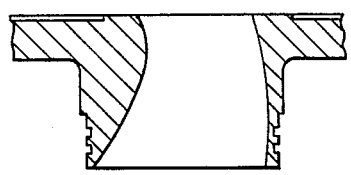
FIG. 25 is a cross-sectional view of the gas outlet in the water manifold of FIG. 23 taken along the line XXV—XXV.
Figure 24:
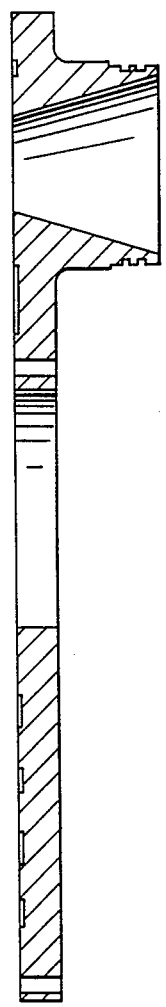
FIG. 24 is a cross-sectional view of the water manifold of FIG. 23 taken along the line XXIV—XXIV.
Figure 26:
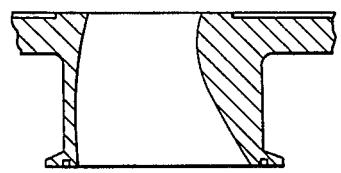
FIG. 26 is a cross-sectional view of the opening for gas inlet in the water manifold of FIG. 23 taken along the line XXVI—XXVI.
Figure 27:
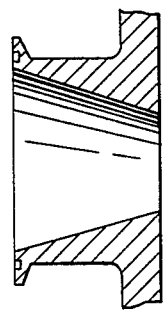
FIG. 27 is a cross-sectional view of the gas inlet taken along the line XXVII—XXVII in FIG. 23.
Figure 23:
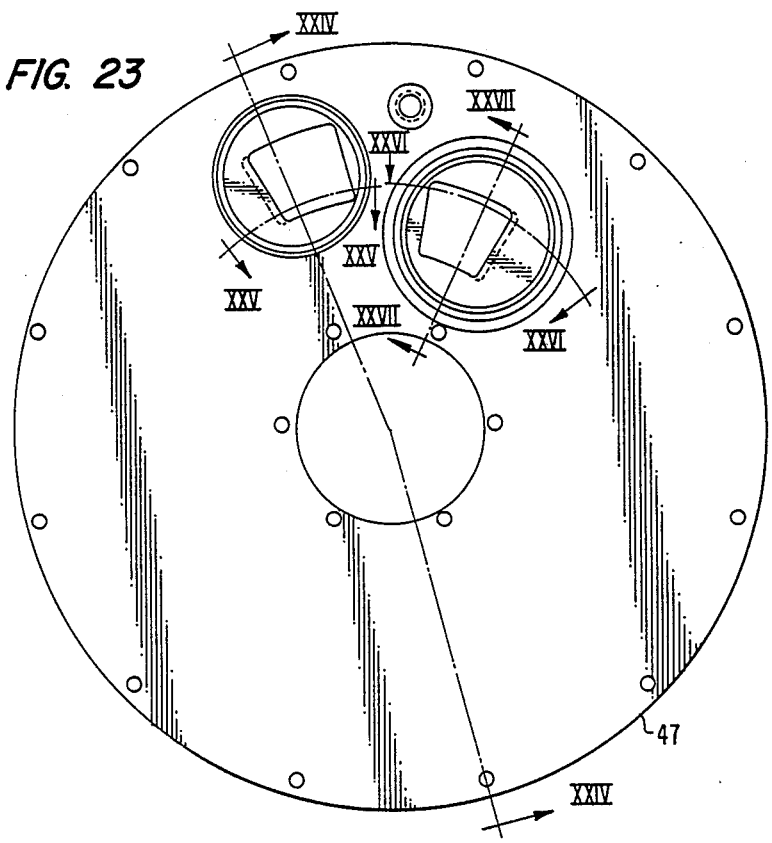
FIG. 23 is an side view of the outer side of the first stage water manifold of the compressor of FIG. 6.

Compressed gas leaving the outlet 60 in the first stage volute 45 is conveyed through the intercooler 61, refer to FIGS. 6 and 11. The intercooler includes a heat exchanger formed with a plurality of concentric tubes 62, 63, 64 and 65. Cooling water is circulated within the tube 62 and between the tubes 63 and 64, while the compressed laser gas is passed between the tubes 62 and 63 and also between 64 and 65 for heat exchange with the coolant. Water is circulated through the intercooler for cooling by means of inlet 66 and outlet 67.

Laser gas cooled in the intercooler 61 is conveyed to the inlet 68 of the second stage of the compressor where it moves through the annular passage 57 therein, is compressed and then passes through the second stage outlet 69. Compressed gas from the compressor 23 is then circulated through heat exchanger 8 where it is cooled before moving in the closed loop 6 through the gas laser 2. The gas exiting the laser 2 passes through heat exchanger 7 before returning to the two stage, double-sided regenerative compressor 23. As an example of the operating parameters or capabilities of the compressor, a $He-N_2-CO_2$ laser gas received from the heat exchanger 7 and operating as gas in laser 2 is cooled to 90° F. as it enters the inlet of the first stage of the compressor 23 at a pressure of 1.764 psi actual (approximately 91 torr). The gas is flowing at a rate of 302 actual cubic feet per minute. After being compressed in the first stage of the compressor, the gas leaving the outlet 60 is at a pressure of 2.562 psi actual, a temperature of 272° F., and flowing at a rate of 276 actual cubic feet per minute. As a result of cooling in the intercooler 61, the gas entering the inlet of the second stage of the compressor is at a temperature of 185° F., a pressure of 2.434 psi actual, and flows at the rate of 256 actual cubic feet per minute. The second stage of the compressor operates to further increase the pressure of the laser gas to 3.355 psi actual at the outlet of the second stage, while the temperature thereof is 332° F. and the flow rate 228 actual cubic feet per minute. The compressed gas is then passed through the heat exchanger 8 where its temperature is dropped from 332° F. to approximately 90° F. for passage through the gas laser 2. The pressure drop through the gas laser is substantial, on the order of 52 to 60 torr, because of the desired mass flow density of the gas and the high speed of the gas in the laser. As noted above, the speed of the gases is stepped up by way of a nozzle to at least one half the speed of sound, and preferably to a speed substantially greater than this and approaching the speed of sound (560 meters per second) in the laser gas. Of course, other operating parameters are possible with the compressor and laser of the invention as will be apparent to the skilled artisan.

The pressure output of the turbine compressor of the invention has a much higher frequency pulse and lower amplitude than that of the conventional Roots blower. Laser discharge stability and laser power output with the gas laser apparatus of the invention are therefore substantially more uniform or stable as compared with the conventional gas laser apparatus employing a Roots blower. The size and weight of the turbine compressor of the invention are also less as compared with the roots blower and the magnitude of vibration is reduced.

To avoid contamination of the laser gas with any lubricants for the bearings 32 and 33, according to the invention a fluid seal 70 is provided for preventing lubricant, from the bearings from moving along the drive shaft in the direction of the impeller. The fluid seal 70 includes a tungsten carbide mating ring 71 sealingly attached to the drive shaft 28 at a location between the bearing 23 and the impeller 24 for rotation with the shaft. A pair of annular, spaced, stationary carbon members 72 and 73 with low friction sliding faces are positioned on respective sides of the mating ring and are yieldably biased against the mating ring by means of springs 74 and 75. The mating ring 71 has a central bore with a diameter of less than 0.001 inch clearance over the drive shaft 28, so that it can be pushed over the shaft. An O-ring 76 located in an annular groove in the shaft beneath the mating ring 71 acts to resist relative rotation between the mating ring and the shaft. The faces of the ring 71 adjacent the members 72 and 73 each have a spiral groove formed therein which extend from a location radially outward of the opposed forces of members 72 and 73 to a location between opposed contacting faces of the ring 71 and members 72 and 73. During rotation of the drive shaft 28 and ring 71 thereon the spiral grooves in the faces of the ring 71 pump gas from within the seal housing 77 between the ring 71 and members 72 and 73 to cause the members 72 and 73 to move away from the ring 71 by a small distance, typically $50 \times 10^{-6}$ inch. The members 72 and 73 move away from the ring 71 against the bias of springs 74 and 75. The stationary ring-shaped members 72 and 73 are sealingly supported within the housing 77 of the fluid seal 70 as shown in FIG. 1. O-rings 78 and 79 assist in sealing. A buffer gas, which may be the same gas as used in the laser, is supplied to the fluid seal 70 through an inlet 80. The buffer gas is at a pressure slightly higher, several psi higher, for example, than the gas within the compressor, closed loop 6 and laser tube 2. The flow rate of the buffer gas is low, for example, one cubic foot per minute or less. This small amount of buffer gas is allowed to bleed into the housing 77 in the area of the mating ring and adjacent sliding faces of the members 72 and 73 and is forced into gap 81 between the impeller and the second stage volute of the compressor and the gap 82 between the housing 77 of the fluid seal 70 and the drive shaft 28 during rotation of the shaft and ring 71 by the aforementioned viscous shear type pumping action of the grooves in the ring moving the members 72 and 73 away from the ring. The flow of buffer gas into the laser through gap 81 reduces the laser make-up gas which is necessary and prevents inflow of atmospheric gas through the gap 81 which would contaminate the laser gas. The positive gas pressure in gap 82 also prevent flow of lubricant from the bearing along the shaft in the direction of the impeller. Higher gas flow rates could be used to provide more make-up gas to the laser, if desired. No lip seals are needed around the shaft. The buffer gas passes through the bearings, but doesn't carry any lubricant with it. As a result of this arrangement, the bearings of the invention have at least a B10 rating and do not require frequent servicing to replace lip seals as in Roots blowers. This is accomplished while avoiding the problems of contamination of the laser gas by any bearing lubricant.

From the above, it is seen that the method of lasing gas in a fast axial flow laser according to the invention comprises the steps of compressing a gas in a turbine type compressor operating with a pressure ratio sufficient to flow the gas along at least a portion of the gas flow path in the laser at a speed of at least half the speed of sound in the laser gas with a compressor inlet pressure which may be 50 to 100 torr or even less, conveying compressed gas from the compressor along the flow path and exciting the gas to cause it to lase. The method includes recirculating the gas through the compressor and the laser tube in a closed loop. The gas is preferably conveyed through at least a portion of the laser tube at a speed which approaches the speed of sound, namely 560 meters per second in the aforementioned gas. The turbine type compressor is operated at a speed of about 10,000 rpm as noted above and is preferably a compressor having a pressure or head coefficient equal to or greater than 0.8. More specifically, according to the preferred embodiment of the invention, the compressor is a two stage, double-sided regenerative compressor, wherein each stage of the compressor has a pressure coefficient of about 3. The gas is cooled between stages, as well as being cooled during compression and before and after compression in its path through the closed loop of the gas laser apparatus. In addition, the method includes the step of positively sealing lubricant in the compressor against movement to the laser gas by means of a fluid seal and providing laser make-up gas to the laser with the seal. The impeller of the compressor is rotated about its axis on the drive shaft at a speed such that the circumferential speed of the impeller is a substantial friction of or near the sonic speed of the gas.

While we have shown and described only several embodiments in accordance with the invention, it is understood that the same is not limited thereto, but is susceptible of numerous changes and modifications as known to those skilled in the art. Therefore, we do not wish to be limited to the detail shown and described herein, but intend to cover all such changes and modifications as are encompassed by the scope of the appended claims.

We claim:

1. A two stage, double sided, regenerative turbine type compressor comprising an impeller rotatable about an axis and having a plurality of blades thereon for forming first and second stages of said compressor on respective sides of said impeller for compressing gas, means defining a passage opposite said blades of the impeller with an inlet and an outlet being provided in said passage for communicating gas to be compressed to and from said passage, means for rotating said impeller and the blades thereon to compress the gas, wherein said compressor has a pressure or head coefficient of at least 0.8 and is capable of operating with a pressure ratio for flowing gas at a speed of at least half the speed of sound in said gas in a fast axial flow laser with inlet pressures to said compressor of less than one-third atmospheric pressure, wherein an intercooler is provided between said first and second stages of said compressor for cooling gas compressed in said first stage before it enters the second stage for further compression, and wherein said means defining a passage opposite said blades includes means for cooling essentially the entire surface of both sides of the compressor and also the radially outer or circumferential surface thereof.

2. A compressor according to claim 1, wherein the blades of the impeller of said regenerative compressor are generally radial blades extending from at or near the tip of said impeller inward a maximum distance of about 50% of the radius of said impeller, and wherein said passage includes a pair of stationary annular passages for peripheral flow of gas in the direction of rotation of said impeller in respective ones of the first and second stages of the compressor.

3. A compressor according to claim 2, wherein an inlet and an outlet are provided in each stationary annular passage for communicating gas to be compressed to and from the annular passage, and wherein a dam is provided blocking each annular passage between the inlet and outlet, each dam having close clearance over the impeller.

4. A compressor according to claim 1, wherein said intercooler includes a heat exchanger and a coolant for heat exchange to cool said gas as it passes through said heat exchanger.

5. A compressor according to claim 2, wherein said means for rotatably driving said impeller comprises a drive shaft upon which said impeller is mounted for rotation at a first location, bearing means for rotatably supporting said drive shaft at a second location on said drive shaft, and a positive pressure fluid seal means located intermediate said first and second locations for preventing contamination and laser gas being compressed of said impeller and laser gas being compressed.

6. A regenerative turbine type compressor comprising an impeller rotatable about an axis and having a plurality of blades thereon for compressing gas, means defining a passage opposite said blades of the impeller with an inlet and an outlet being provided in said passage for communicating gas to be compressed to and from said passage, means for rotating said impeller and the blades thereon to compress the gas, wherein said compressor has a pressure or head coefficient of at least 0.8 and is capable of operating with a pressure ratio for flowing gas at a speed of at least half the speed of sound in said gas in a fast axial flow laser with inlet pressures to said compressor of less than one-third atmospheric pressure, wherein the blades of said impeller are generally radial blades extending from at or near the tip of said impeller inward a maximum distance of about 50% of the radius of said impeller, wherein said passage is a stationary annular passage for peripheral flow of gas in the direction of rotation of said impeller, wherein said means for rotably driving said impeller comprises a drive shaft upon which said impeller is mounted for rotation at a first location bearing means for rotatably supporting said drive shaft at a second location on said drive shaft, and a positive pressure fluid seal means located intermediate said first and second locations for preventing contamination from said bearing means from moving along said drive shaft in the direction of said impeller, and wherein said fluid seal means includes a mating ring sealingly attached to said drive shaft at a location between said first and second locations for rotation with said shaft, a pair of spaced stationary members presenting respective sliding faces adjacent respective opposite sides of said mating ring, and means for directing a fluid under a pressure above the pressure of gas in said compressor between said sliding faces and said mating ring and along said shaft during operation of said compressor to prevent contamination from said bearing means from moving along said drive shaft to said impeller.

7. A compressor according to claim 6, wherein said regenerative compressor is a single stage compressor.

8. A compressor according to claim 6, wherein said regenerative compressor comprises at least two stages.

9. A compressor according to claim 8, wherein first and second stages of said compressor are located on respective sides of said impeller.

10. A compressor according to claim 8, wherein an intercooler is provided between said first and second stages of said compressor for cooling gas compressed in said first stage before it enters that second stage for further compression.

11. A regenerative turbine type compressor comprising an impeller rotatable about an axis and having a plurality of blades thereon for compressing gas, means defining a passage opposite said blades of the impeller with an inlet and outlet being provided in said passage for communicating gas to be compressed to and from said passage, means for rotating said impeller and the blades thereon to compress the gas, and wherein said compressor has a pressure or head coefficient of at least 0.8 and is capable of operating with a pressure ratio for flowing gas at a speed of at least half the speed of sound in said gas in a fast axial flow laser with inlet pressures to said compressor of less than one-third atmospheric pressure, wherein the blades of the impeller of said regenerative compressor are generally radial blades extending from at or near the tip of said impeller inward a maximum distance of about 50% of the radius of said impeller, wherein said passage is a stationary annular passage for peripheral flow of gas in the direction of rotation of said impeller, wherein said means for rotatably driving said impeller comprises a drive shaft upon which said impeller is mounted for rotation at a first location, bearing means for rotatably supporting said drive shaft at a second location on said drive shaft, and a positive pressure fluid seal means located intermediate said first and second locations for preventing contamination from said bearing means from moving along said drive shaft in the direction of said impeller, and wherein said fluid seal means is located adjacent an impeller housing of said impeller and the positive pressure fluid of said seal is a gas which is non contaminating with respect to said laser gas and which is permitted to migrate into said passage as a make-up gas for said gas to be compressed and to thereby prevent the ambient atmosphere from leading into the gas.

12. A compressor according to claim 1, wherein said means for driving said shaft rotates said shaft at a speed of about 10,000 rpm.

13. A compressor according to claim 1, wherein said compressor comprises an impeller rotatable about an axis and means for rotating the impeller at a speed such that the circumferential speed of the impeller is a substantial portion of the sonic speed vs for said gas where $$vs = nRT$$

where n is the isentropic exponent of the gas,
R is the individual gas constant, and
T is the absolute temperature.

14. A compressor according to claim 1, wherein the pressure ratio pr of the compressor depends on the mixture of gas used therewith and the mixing ratio of the components of the gas mixture, the pressure ratio pr being expressed by $$pr = (2/(n+1)) \exp (n/n-1)$$

where n is the isentropic exponent of the gas mixture.

15. A compressor according to claim 1, wherein said gas is a mixture of helium, nitrogen and carbon dioxide.

16. A compressor according to claim 6, wherein means are provided for cooling essentially the entire surface of both sides of the compressor and also the radially outer or circumferential surface thereof.

* * * * *

UNITED STATES PATENT AND TRADEMARK OFFICE
CERTIFICATE OF CORRECTION

PATENT NO. : 4,923,364
DATED : May 8, 1990
INVENTOR(S) : Carl J. NILSEN and Hardy P. WEISS It is certified that error appears in the above-indentified patent and that said Letters Patent is hereby corrected as shown below:

Column 13, claim 5, should read as follows:

5. A compressor according to claim 2, wherein said means for rotatably driving said impeller comprises a drive shaft upon which said impeller is mounted for rotation at a first location, bearing means for rotatably supporting said drive shaft at a second location on said drive shaft, and a positive pressure fluid seal means located intermediate said first and second locations for preventing contamination of said impeller and laser gas being compressed.

Signed and Sealed this

Fifth Day of July, 1994

*Attest:*

BRUCE LEHMAN

*Attesting Officer*          *Commissioner of Patents and Trademarks*